US012725989B2

(12) United States Patent
Schnobrich

(10) Patent No.: US 12,725,989 B2

(45) Date of Patent: Sep. 1, 2026

(54) MULTI-PIECE COAXIAL PLUG CONNECTOR WITH VARIABLY CONFIGURABLE INTERFACE GEOMETRY

(71) Applicant: MD ELEKTRONIK GmbH, Waldkraiburg (DE)

(72) Inventor: Sabrina Schnobrich, Waldkraiburg (DE)

(73) Assignee: MD Elektronik GmbH, Waldkraiburg (DE)

(*) Notice: Subject to any disclaimer, the term of this patent is extended or adjusted under 35 U.S.C. 154(b) by 330 days.

(21) Appl. No.: 18/584,378

(22) Filed: Feb. 22, 2024

(65) Prior Publication Data

US 2024/0313488 A1 Sep. 19, 2024

(30) Foreign Application Priority Data

Mar. 14, 2023 (DE) ..................... 10 2023 106 261.1

(51) Int. Cl.

*H01R 24/40* (2011.01)
*H01R 43/20* (2006.01)
*H01R 103/00* (2006.01)

(52) U.S. Cl.

CPC ............. *H01R 24/40* (2013.01); *H01R 43/20* (2013.01); *H01R 2103/00* (2013.01)

(58) Field of Classification Search

None

See application file for complete search history.

(56) References Cited

U.S. PATENT DOCUMENTS

| | | | | | |
|---|---|---|---|---|---|
| 2,813,144 | A * | 11/1957 | Valach | H01R 24/545 | 333/260 |
| 3,311,866 | A * | 3/1967 | Williamson | H01R 13/631 | 439/732 |
| 3,432,798 | A * | 3/1969 | Brishka | H01R 24/545 | 439/582 |
| 4,445,745 | A * | 5/1984 | Cartesse | H01R 24/40 | 439/585 |
| 6,057,510 | A | 5/2000 | Acke | | |
| 10,938,169 | B2 | 3/2021 | De Cloet et al. | | |
| 2008/0188119 | A1 | 8/2008 | Okamura et al. | | |
| 2011/0021070 | A1 | 1/2011 | Burris et al. | | |

FOREIGN PATENT DOCUMENTS

| | | | | |
|---|---|---|---|---|
| CN | 114039236 A * | 2/2022 | H01R 13/5025 |
| DE | 4434702 C1 | 1/1996 | |
| EP | 1811613 A1 * | 7/2007 | H01R 24/545 |
| WO | WO-9631925 A1 * | 10/1996 | H01R 24/545 |

* cited by examiner

*Primary Examiner* — Tho D Ta

(74) *Attorney, Agent, or Firm* — Maier & Maier, PLLC

(57) ABSTRACT

A coaxial plug connector includes a cable portion and an interface portion. The cable portion has an outer cable contact, a cable insulator and an elongated inner cable contact, the cable insulator is arranged in the outer cable contact, the inner cable contact is spaced apart from the outer cable contact by the cable insulator and the inner cable contact is to be electrically connected to a cable. The interface portion has an outer interface contact, an interface insulator and an elongated inner interface contact, the interface insulator is arranged in the outer interface contact and the inner interface contact is spaced apart from the outer interface contact by the interface insulator. The inner interface contact is attached to the cable insulator.

16 Claims, 3 Drawing Sheets

MULTI-PIECE COAXIAL PLUG CONNECTOR WITH VARIABLY CONFIGURABLE INTERFACE GEOMETRY

FIELD

The present invention relates to a coaxial plug connector which is constructed from a plurality of pieces and which is variably configurable with regards to an interface geometry. The invention also relates to a method of manufacturing such a coaxial plug connector.

BACKGROUND

Coaxial plug connectors are used to connect at least two coaxial cables to one another in an electrically conductive manner or to connect a coaxial cable to a coaxial terminal of an appliance, for example. A coaxial cable has an electrically conductive inner conductor, an electrically conductive outer conductor and an intermediate insulation layer between the inner conductor and the outer conductor. The outer conductor generally encloses the inner conductor, but is electrically insulated from the inner conductor by the intermediate insulation layer. Consequently, the outer conductor may serve as shielding, for example to shield the inner conductor against interference from radiated electromagnetic fields. Two coaxial cables may be connected to one another by means of coaxial plug connectors, each of which is attached to one end of one of the coaxial cables, to form a coaxial connection. Therein, both the inner conductors and the outer conductors of the two cables are brought into electrical contact with one another, whilst at the same time it is ensured that there is always sufficient electrical insulation between the inner conductors and the outer conductors within the coaxial connection.

The two coaxial plug connectors are each configured with a complementary interface geometry so that they may be mechanically and electrically coupled together. In terms of the interface geometry, one of the two coaxial plug connectors may be configured as a plug and the other coaxial plug connector may be configured as a matching socket.

Coaxial plug connectors have been proposed that are constructed from a plurality of pieces and in terms of their interface geometry may be variably adapted for different applications. For example, U.S. Pat. No. 10,938,169 B2 describes a coaxial connector composed of a cable portion and an interface portion as well as a method for its manufacture.

Furthermore, DE 44 34 702 C1 describes an insulation displacement connection device for a coaxial cable, in particular an angled coaxial cable coupler. Therein, it is described that an exposed inner conductor of a coaxial cable is provided with an "IDC contact element" so that the contact element may be arranged in a housing. A pressure piece made of an insulating material is applied to the contact element, which is pushed onto a head of the contact element. When a screw is tightened, the inner conductor part may be fixed in a clamping slot in the pressure piece. A cable-side contact element is described, the cable-side contact element being fixed in a cable-side insulator.

WO 96/31925 A1 describes a plug-side inner conductor which is arranged in a plug-side insulator and partially in a cable-side insulator. The plug-side inner conductor is attached to a cable-side contact element via a "wire end adapter". In particular, arms grip onto a fastening portion of the adapter. Although the plug-side inner conductor is partially accommodated in a receiving recess of the cable-side insulator, it is not directly fixed to the cable-side insulator. What prevents the plug-side inner conductor (to the left in FIG. 1) from being pulled out is the attachment to the cable-side contact element (and a collar that presses from an opposite side against the right-hand end of the plug-side insulator).

SUMMARY

There may be a need for an alternative and/or improved electrical coaxial plug connector. In particular, there may be a need for a coaxial plug connector that is easy to manufacture, especially on an industrial scale in large quantities. There may also be a need for an alternative and/or improved method of manufacturing such a coaxial plug connector.

Such a need may be met by the subject matter of one of the independent claims. Advantageous embodiments are presented in the dependent claims, the following description and the attached figures.

A first aspect of the invention relates to a coaxial plug connector. The coaxial plug connector has a cable portion and an interface portion. The cable portion has an outer cable contact, a cable insulator, and an elongated inner cable contact. Therein, the cable insulator is arranged in the outer cable contact, the inner cable contact is spaced apart from the outer cable contact by the cable insulator, and the inner cable contact is to be electrically connected to a cable. The interface portion has an outer interface contact, an interface insulator and an elongated inner interface contact. Therein, the interface insulator is arranged in the outer interface contact and the inner interface contact is spaced apart from the outer interface contact by the interface insulator. The inner interface contact is attached to the cable insulator.

A second aspect of the invention relates to a method of manufacturing a coaxial plug connector according to an embodiment of the first aspect of the invention. The method includes at least the following process steps, preferably, but not necessarily, in the order indicated:

providing the outer cable contact, the cable insulator, the elongated inner cable contact, the outer interface contact, the interface insulator and the elongated inner interface contact; attaching the outer interface contact to the outer cable contact; inserting the interface insulator into the outer interface contact; fastening the inner interface contact to the cable insulator; inserting the inner interface contact together with the cable insulator attached thereto into an inner volume in the outer cable contact; inserting the inner cable contact together with a cable connected thereto into the cable insulator accommodated in the outer cable contact and bringing the inner cable contact into contact with the inner interface contact.

By way of introduction, a basic idea and possible advantages concerning embodiments of the invention described herein will be briefly explained, this explanation to be interpreted as merely roughly summarizing and not limiting the invention:

The coaxial plug connector described herein is constructed from a plurality of pieces and comprises at least a cable portion and an interface portion. Both portions consist of an outer contact, an inner contact and an insulator arranged between these two contacts and insulating these two contacts from each other. While the cable portion may always be constructed in the same way for different applications, the interface portion may be differently constructed depending on the application and, in particular, may form different interface geometries. Since the interface portion may be configured for specific applications, i.e. in particular its interface geometry may be adapted to different interface geometries as used in different mating plug connectors for different applications, the coaxial plug connector may easily be adapted for different applications. Therein, only the interface portion or its components need to be modified, whereas the cable portion may remain the same for different applications. When manufacturing the coaxial plug connector, the interface portion may thus be selected from a number of possible interface portions. The interface portion may then be mechanically and electrically connected to the cable portion. A connection between the interface portion and the cable portion should preferably be irreversible, i.e. the interface portion and the cable portion should be non-interchangeably connected so that the interface portion may no longer be separated from the cable portion without damage after the coaxial plug connector has been assembled.

A special feature of the coaxial plug connector proposed herein is that the inner interface contact of the interface portion is attached to the cable insulator of the cable portion. Among other things, when manufacturing the coaxial plug connector this may allow the inner interface contact to be attached to the cable insulator beforehand, so that both may then be handled and further processed as a unit. This may simplify a production process and, in particular, may make it easier to automate.

Possible embodiments and advantages of embodiments of the coaxial plug connector and a method of manufacturing the same are described in more detail below:

The coaxial plug connector has at least two portions, namely the cable portion and the interface portion, thus it has a multi-piece design. Both the cable portion and the interface portion are each composed of a plurality of components. The cable portion comprises at least one outer cable contact, at least one inner cable contact and at least one cable insulator. The interface portion comprises at least one outer interface contact, at least one inner interface contact and at least one interface insulator. The components of the cable portion may be manufactured or provided separately from the components of the interface portion and only mechanically and electrically connected to them when the coaxial plug connector is assembled.

The term "contact" is used herein to refer to an electrically conductive structure or an electrically conductive component. In particular, the contact may be made of metal. For example, the contact, in particular the inner interface contact and/or the inner cable contact, may be a component which is manufactured from a metal sheet by punching and/or bending, i.e. as a punched/bent component. Alternatively, the contact, in particular the outer interface contact and/or the outer cable contact, may be a die-cast component, a punched/bent component or a deep-drawn component. Alternatively, the contact may be configured as a pin, in particular as a solid pin or a hollow pin. Each individual contact may be constructed in one piece, i.e. formed from a single sheet. In principle, however, a single contact may also have a multi-piece structure. The contact may be rigid, in particular more rigid than a cable to be connected to it.

The term "insulator" is used to refer to an electrically insulating structure or an electrically insulating component. In particular, the insulator may consist of an electrically non-conductive material such as a dielectric, especially a plastic. For example, the insulator may be configured as an injection molded component. The insulator may have a one-piece or multi-piece design.

The inner cable contact is elongated. In other words, a dimension of the inner cable contact in a longitudinal direction, that is to say, a length, is greater than a dimension in a transverse direction, that is to say, a width. In particular, the inner cable contact may be straight or pin-like. At a first end, the inner cable contact may be specially configured to connect an end of a cable to the inner cable contact. In particular, provision may be made for connecting an inner conductor of a coaxial cable to the inner cable contact. For this purpose a crimp structure, for example, may be provided at the first end of the inner cable contact, by means of which the inner cable contact may be crimped, for example, to exposed strands of the inner conductor of the cable to be connected. However, the first end of the inner cable contact may alternatively also be connected to the cable to be connected in another way, for example by soldering, welding, bonding, etc. At a second end opposite the first end, the inner cable contact may be configured to interact with the inner interface contact in such a way that an electrically conductive connection is established between the two. In particular, the inner cable contact and the inner interface contact may be geometrically configured in such a way that they may be mechanically plugged together, thereby ensuring good electrical contact between the two components.

The cable insulator is preferably also elongated. The cable insulator may be the same length as or longer or shorter than the inner cable contact. The cable insulator may be configured as a sleeve or it may be sleeve-like. In particular, the cable insulator may be configured as a cylindrical component, i.e. as a tube. The cable insulator may have a circular, rectangular or geometrically differently formed cross-section. The cable insulator may enclose, with a circumferential surface, a radially inner lying, preferably central, elongated cavity. The inner cable contact may be arranged in this cavity. In particular, the cavity may be dimensioned and/or shaped such that the inner cable contact may be inserted at least partially into the cavity of the cable insulator with a precise fit or without play. For this purpose, outer cross-sectional dimensions of the inner cable contact may be substantially the same size as or only slightly smaller or larger than the inner cross-sectional dimensions of the cavity in the cable insulator. An outer contour of the inner cable contact may be complementary to an inner contour of the cable insulator. In the case of cylindrical cross-sections, an outer diameter of the inner cable contact may therefore be the same size as or slightly smaller or larger than an inner diameter of the cable insulator. The cable insulator may surround or enclose the inner cable contact accommodated in its cavity along its entire length and/or along its entire circumference. The cable insulator is accordingly able to ensure good electrical insulation between the inner cable contact and components lying radially further outwards, in particular the outer cable contact. Therein, the inner cable contact and the cable insulator may be latched together, pressed together or attached to one another in some other way.

The outer cable contact is preferably also elongated. It may be the same length as or longer or shorter than the inner cable contact and/or than the cable insulator. The outer cable contact may serve as a housing for the coaxial plug connector in its cable portion. The outer cable contact may be configured as a sleeve or it may be sleeve-like. In particular, the outer cable contact may be configured as a cylindrical component. The outer cable contact may have a circular, rectangular or geometrically different cross-section. The outer cable contact may enclose, with a circumferential surface, a radially inner lying, preferably central, elongated cavity. The cable insulator may be arranged in this cavity. In particular, the cavity may be dimensioned and/or shaped such that the cable insulator may be inserted at least partially into the cavity of the outer cable contact with a precise fit or without play. For this purpose, outer cross-sectional dimensions of the cable insulator may be substantially the same size as or only slightly smaller or larger than the inner cross-sectional dimensions of the cavity in the cable insulator. An outer contour of the cable insulator may be complementary to an inner contour of the outer cable contact. In the case of cylindrical cross-sections, an outer diameter of the cable insulator may therefore be the same size as or slightly smaller or larger than an inner diameter of the outer cable contact. The cable insulator and the outer cable contact may be latched together, pressed together, bonded or attached to one another in some other way. The outer cable contact may surround or enclose the cable insulator accommodated in its cavity along its entire length and/or along its entire circumference. The cable insulator is accordingly able to provide good electromagnetic shielding for the inner cable contact accommodated in the cable insulator. At a first end, the outer cable contact may be specially configured to connect the end of the cable to the outer cable contact. In particular, provision may be made for connecting an outer conductor of a coaxial cable to the outer cable contact. For this purpose a crimp structure, for example, may be provided at the first end of the outer cable contact, by means of which the outer cable contact may be crimped, for example, to exposed strands of the outer conductor of the cable to be connected. However, the first end of the outer cable contact may alternatively also be connected to the cable to be connected in another way, for example by soldering, welding, bonding, etc. At a second end opposite the first end, the outer cable contact may be configured to interact mechanically and electrically with the interface portion. In particular, the second end of the outer cable contact may interact with the outer interface contact in such a way that an electrically conductive connection is established between the two. In particular, the outer cable contact and the outer interface contact may be geometrically configured in such a way that they may be mechanically plugged together and/or pressed together, thereby ensuring good electrical contact between the two components.

Overall, the inner cable contact may be arranged radially centrally in the cable portion and extend longitudinally from the first end connected to the cable to the second end connected to the inner interface contact. The inner cable contact runs radially within and preferably coaxially with the cable insulator surrounding it. The cable insulator is in turn accommodated radially within and preferably coaxially with the outer cable contact surrounding it. The cable insulator thus separates the inner cable contact from the outer cable contact both geometrically and electrically.

Components of the interface portion may be of the same or similar design as corresponding components of the cable portion. In particular, the inner interface contact may have same properties as or similar properties to the inner cable contact, the interface insulator may have same properties as or similar properties to the cable insulator, and/or the outer interface contact may have same properties as or similar properties to the outer cable contact. Especially functional properties of the components of the interface portion may be the same as or similar to those of the corresponding components of the cable portion.

However, geometric configurations of the various components of the interface portion may differ from those of corresponding components of the cable portion. For example, a circumference, a length and/or a contour of the inner interface contact, the interface insulator and/or the outer interface contact may differ from those of corresponding components of the cable portion. In particular, these geometric configurations may be chosen such that the interface portion has a desired interface geometry on its side facing away from the cable portion. This interface geometry is defined, among other things, by a cross-sectional shape, cross-sectional dimensions and/or lengths of the inner interface contact, the interface insulator and/or the outer interface contact, and possibly a positioning of these components relative to one another. The interface geometry at the interface portion may be configured so as to be able to plug the coaxial plug connector with its interface portion together with a mating plug connector that is configured with a correspondingly complementary interface geometry. The interface geometry of the coaxial plug connector may be configured as a plug and the interface geometry of the mating plug connector may be accordingly configured as a socket, or vice versa.

In the finally assembled coaxial plug connector, the inner cable contact is electrically connected to the inner interface contact. This enables an electrical connection from the cable connected to the inner cable contact, particularly in the case of a coaxial cable, from its inner conductor, via the inner cable contact and the inner interface contact, to an inner contact of a mating plug connector plugged together with the coaxial plug connector. Furthermore, the outer cable contact is electrically connected to the outer interface contact. This allows electromagnetic shielding of the inner cable contact and the inner interface contact. In particular, this enables an electrical connection between the cable connected to the outer cable contact, in particular in the case of a coaxial cable from its outer conductor, via the outer cable contact and the outer interface contact to an outer contact of a mating plug connector plugged together with the coaxial plug connector. The cable insulator and the interface insulator ensure that the inner cable contact and the inner interface contact remain spaced apart and electrically insulated from the surrounding outer cable contact and the outer interface contact. The cable insulator and the interface insulator may preferably be configured such that they fill an inner volume of the coaxial plug connector enclosed by the outer cable contact and the outer interface contact preferably completely or at least by more than 90%.

According to one embodiment, in the coaxial plug connector described herein, a longitudinal direction of extension of the interface portion run transversely to a longitudinal direction of extension of the cable portion. In other words, the coaxial plug connector may be configured as an angled plug connector. Therein, a longitudinal direction of extension of the cable portion, which generally corresponds to a longitudinal direction of extension of the inner cable contact and the cable connected thereto, may be transverse and preferably perpendicular to a longitudinal direction of extension of the interface portion, which generally corresponds to a longitudinal direction of extension of the inner interface contact and/or an insertion direction in which the coaxial plug connector may be plugged together with a mating plug connector. Such an angled configuration allows the coaxial plug connector to be used advantageously even in confined spaces.

However, the coaxial plug connector described herein may alternatively have a non-angled configuration in which the interface portion and the cable portion are arranged in the same direction or in directions parallel to each other.

A special feature of the coaxial plug connector described herein is that its inner interface contact is attached to the cable insulator. In this case the inner interface contact may be attached to the cable insulator by form-fitting interaction between the two components. Additionally or alternatively, both components may interact in a force-fitting manner. In particular, the inner interface contact should be attached to the cable insulator in such a way that, when assembling the coaxial plug connector, it may be attached to the cable insulator at an early stage of the assembly process. The inner interface contact and the cable insulator may then be handled together as a unit and, in particular, coupled with other components of the coaxial plug connector in subsequent assembly steps. For example, the cable insulator together with the inner interface contact attached to it may be inserted, in particular pushed, into the inner volume in the outer cable contact. By attaching the inner interface contact to the cable insulator beforehand and then handling the two together as a unit, production of the coaxial connector may be simplified, especially on a highly automated, industrial scale.

According to one embodiment, the inner interface contact is spaced apart from the interface insulator. In other words, although the inner interface contact is attached to the cable insulator and is directly adjacent to the cable insulator, the inner interface contact is not directly adjacent to the interface insulator. Fixation of the inner interface contact within the coaxial plug connector, in particular fixation in a longitudinal direction of the inner interface contact, is thus achieved predominantly or even exclusively by form-fitting and/or force-fitting interaction between the inner interface contact and the cable insulator, but not by form-fitting interaction between the inner interface contact and the interface insulator. This may simplify assembly of the coaxial plug connector, among other things.

According to one embodiment, the inner interface contact has at least one radially outwardly projecting latching tab. Furthermore, the cable insulator has at least one recess in which the latching tab of the inner interface contact engages in a latching manner.

In other words, the inner interface contact may have a latching tab with which it may be latched in a matching recess in the cable insulator. With no force applied to it, the latching tab may project radially outwards from a lateral surface or circumferential surface of the inner interface contact. When force is applied, the latching tab may be elastically deformed and displaced radially inwards. Consequently, the elongated inner interface contact may be inserted in its longitudinal direction, for example, into a suitable elongated cavity in the cable insulator and moved to a position in which its latching tab engages in the recess in the cable insulator, i.e. engages in a form-fitting manner, thereby fastening the inner interface contact to the cable insulator.

The latching tab may be formed in one piece with the rest of the inner interface contact, i.e. for example as a punched-out and radially outwardly bent portion of a punched and bent component forming the inner interface contact.

Preferably, the inner interface contact may have a plurality of latching tabs. In particular, two, three, four or more latching tabs may be provided. The latching tabs may be arranged at different, preferably equidistantly spaced positions along the circumference of the inner interface contact. A plurality of recesses may accordingly be provided on the cable insulator at positions matching the latching tabs. The latching tabs and the recesses may be positioned in a symmetrical arrangement. With the aid of the preferably multiple and possibly symmetrically arranged latching tabs and recesses, the inner interface contact may be attached to the cable insulator particularly efficiently, and it may be ensured that forces occurring during latching, for example, do not cause any tilting or even skewing of the inner interface contact during the assembly process.

According to a further specific embodiment, the recess in the cable insulator is provided at a position which is spaced from an end face of the interface insulator in a direction parallel to a longitudinal direction of extension of the inner interface contact. In this case the recess is not covered by the interface insulator.

In other words, the inner interface contact may be configured with respect to the positioning of the tab and the cable insulator with respect to the positioning of the recess, on the one hand, and the interface insulator may be configured with respect to its geometric configuration and arrangement in the coaxial connector, on the other hand, such that the recess in the cable insulator is not covered by the interface insulator, but is spaced apart from the end face of the interface insulator.

According to a further specific embodiment, the recess in the cable insulator is provided at a position which is located within the inner volume surrounded by the outer cable contact.

In other words, the inner interface contact may be configured with respect to the positioning of the tab and the cable insulator with respect to the positioning of the recess, on the one hand, and the outer cable contact may be configured with respect to its geometric configuration and arrangement on the coaxial connector, on the other hand, such that the recess in the cable insulator is accommodated within the inner volume in the outer cable contact.

The two aforementioned embodiments may, among other things, enable a coaxial plug connector of particularly compact design.

According to an alternative embodiment, the recess in the cable insulator is provided at a position which is covered by the interface insulator.

In other words, the recess provided in the cable insulator for engaging the latching tab may be positioned in such a way that it is overlapped by the interface insulator in the direction parallel to the longitudinal direction of extension of the inner interface contact.

According to a further alternative embodiment, the recess in the cable insulator may be provided at a position which is located outside the inner volume surrounded by the outer cable contact.

In other words, the recess in the cable insulator may be configured to be in a position that is not in the cable portion but rather in the interface portion of the coaxial plug connector.

The two aforementioned embodiments may, among other things, simplify the assembly of the coaxial plug connector.

According to one embodiment, the cable insulator comprises a cable region and an interface region. In this case the inner cable contact is arranged in the cable region of the cable insulator. The interface region of the cable insulator is arranged at least partially in the interface insulator. The inner interface contact is arranged at least partially in the interface region of the cable insulator.

In other words, the cable insulator may comprise two different regions, the cable region being configured to accommodate the inner cable contact and to enclose it in an insulating manner with respect to the outer cable contact, whereas the interface region is configured to accommodate at least a section of the interface contact. Furthermore, the interface region of the cable insulator on the one hand and the interface insulator on the other hand are configured such that the interface region of the cable insulator may be arranged at least partially within the interface insulator and both insulators together thus enclose the inner interface contact, spacing it from the outer interface contact and insulating it electrically. The inner interface contact and the interface region of the cable insulator may be latched together, i.e. one or more latching tabs projecting from the inner interface contact may engage in recesses formed on the interface region of the cable insulator. Therefore, the cable insulator may implement different functionalities within the coaxial plug connector with its cable region and its interface region. Nevertheless, the cable insulator may be constructed in one piece, for example as a one-piece injection-molded component.

According to a specific embodiment, a longitudinal direction of extension of the cable region runs transversely to a longitudinal direction of extension of the interface region of the cable insulator.

In other words, in terms of the arrangement or orientation of its cable region and its interface region, the cable insulator may be configured to be angled, in particular right-angled. In particular, such a cable insulator may advantageously be used to form an angled coaxial plug connector. The cable region of the cable insulator may run within the cable portion of the coaxial plug connector, whereas the interface region of the cable insulator may run at least partially or predominantly within the interface portion of the coaxial plug connector.

According to one embodiment, the outer cable contact comprises a first opening, a second opening and a third opening. The first opening is arranged on an end face of the outer cable contact. The second opening is arranged on the outer cable contact at a distance from the first opening. The third opening is formed and arranged on a circumferential surface of the outer cable contact in such a way that, during the assembly process, the cable insulator may be inserted through the third opening into an inner volume in the outer cable contact.

In other words, the outer cable contact of the coaxial plug connector proposed herein may not only have a first opening through which, for example, a connection to a cable may be made, and a second opening through which a connection to the interface portion may be made, but a third opening may additionally be provided on the outer cable contact. The first opening may be arranged and configured in such a way that, during an assembly process, the inner cable contact may be inserted through the first opening in a first insertion direction into an inner volume in the outer cable contact surrounded by a circumferential surface of the outer cable contact. The second opening may be arranged and configured in such a way that the inner interface contact may protrude through the second opening both into the inner volume and into an adjacent space outside the outer cable contact. The third opening may be arranged and configured in such a way that, during the assembly process, the cable insulator may be inserted through the third opening in a second insertion direction into the inner volume in the outer cable contact. Therein, the second insertion direction is transverse, preferably perpendicular, to the first insertion direction.

Providing the third opening in the outer cable contact means that, when assembling the coaxial plug connector, the cable insulator does not necessarily have to be inserted through the first opening into the outer cable contact in the longitudinal direction of the inner cable contact to be accommodated therein, i.e. in the first insertion direction. Instead, the cable insulator may be inserted through the third opening into the inner volume in the outer cable contact in the second insertion direction, which is transverse, preferably perpendicular, to this. Therein, the inner interface contact may be attached to the cable insulator beforehand and both may be inserted together as a unit into the inner volume in the outer cable contact. In other words, according to one embodiment of the manufacturing process proposed herein, the inner interface contact together with the cable insulator attached thereto may be inserted through the third opening of the outer cable contact into the inner volume in the outer cable contact. This may significantly simplify the assembly process.

According to a further specific embodiment, the third opening may be closed by a cover.

The cover preferably closes the entire third opening of the fully assembled coaxial plug connector, i.e. it preferably covers the whole area of the third opening. In other words, the third opening may only be opened during the assembly process and may be closed with the cover as soon as the cable insulator has been accommodated in the outer cable contact. The cover is preferably made of an electrically conductive material and is preferably electrically connected to the outer cable contact. Consequently, the outer cable contact, together with the cover, may form a closed circumferential surface which encloses the inner cable contact and may therefore serve as shielding. The cover may be irreversibly connected to the outer cable contact after the coaxial plug connector has been assembled, meaning that it may not be detached or replaced. For example, the cover may be latched, soldered, welded, bonded or otherwise mechanically connected to the outer cable contact.

According to a further specified embodiment, the second opening and the third opening may lie opposite one another.

Such a configuration may be particularly advantageous if the coaxial plug connector is angled. In this case, the cable insulator may be introduced into the inner volume of the outer cable contact through the third opening. The inner interface contact, which is attached to the cable insulator beforehand or subsequently, may protrude through the second opening towards the interface portion. This may significantly simplify the assembly process.

Overall, according to one embodiment, the method for manufacturing the coaxial plug connector may be configured such that the coaxial plug connector may be manufactured with an interface geometry that is adapted for a specific application, the interface geometry being selected for a plurality of different applications.

For this purpose, according to one embodiment, the interface portion may be configured in an application-specific manner by selecting the outer interface contact, the interface insulator and/or the elongated inner interface contact from a plurality of available respective components such that the interface portion has an application-specific geometry in terms of shape and/or dimensions so as to enter into a mechanical and electrical connection with an application-specific mating plug connector from a plurality of possible mating plug connectors.

Depending on the application, the approach proposed here may therefore be used to easily manufacture coaxial plug connectors with different designs whose interface geometry is adapted to different types of mating plug connectors. While the components of the interface portion to be used may differ depending on the application, the same cable portion may be used for each application, which simplifies an overall complexity of both the coaxial plug connector and the process for manufacturing it.

In the coaxial plug connector described herein, at least one radially outwardly projecting first projection may be formed on the inner interface contact as first component and/or at least one radially inwardly projecting second projection may be formed on the cable insulator, in particular on an interface region of the cable insulator, as second component. For example, a radially outwardly projecting embossing or a radially outwardly projecting fold may be formed as first projection on the inner interface contact. Alternatively, a radially inwardly projecting crush rib may be formed on the second component as second projection.

It should be noted that some of the possible features and advantages of the invention are described herein on the one hand with reference to different embodiments of the coaxial plug connector described herein, and on the other hand with reference to methods of manufacturing the same. A person skilled in the art will recognize that the features may be suitably combined, transferred, adapted or interchanged to arrive at further embodiments of the invention.

BRIEF DESCRIPTION OF THE DRAWINGS

Advantageous embodiments of the invention are further explained below with reference to the accompanying drawings, in which neither the drawings nor the explanations are to be construed as limiting the invention in any way.

The figures are merely schematic and not to scale. Identical reference numbers in the different drawings denote identical or identically acting features.

DETAILED DESCRIPTION

Figure 1:
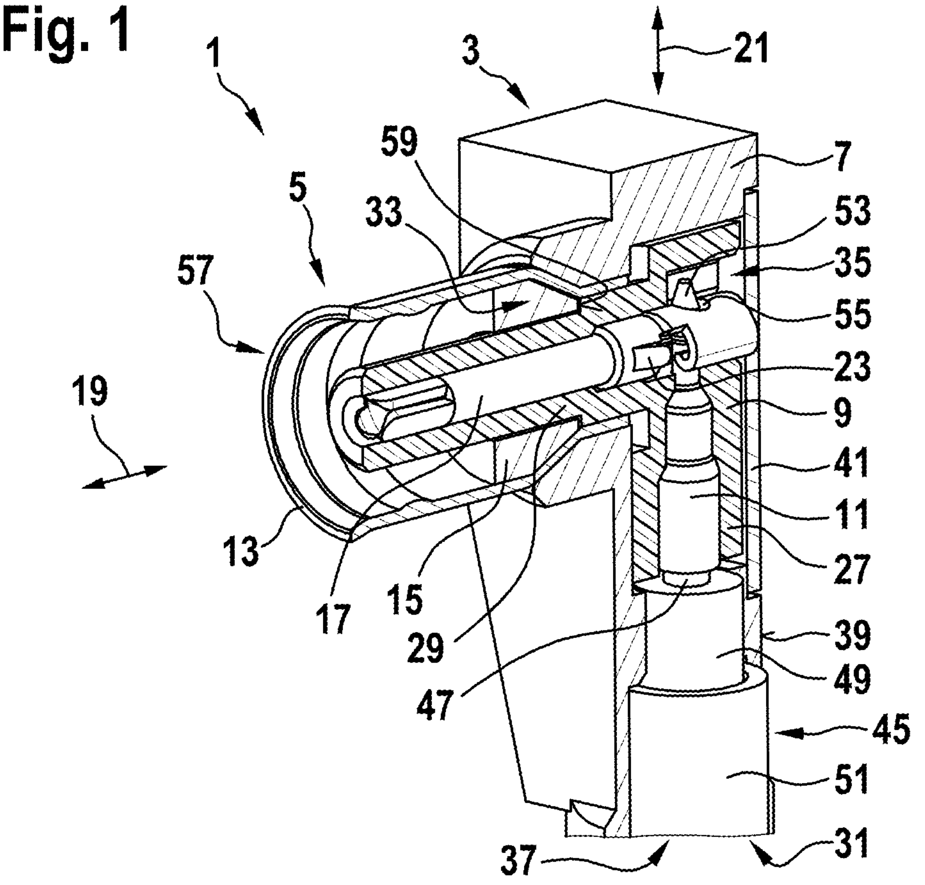
FIG. 1 shows a perspective cross-sectional view through a coaxial plug connector according to a first embodiment of the present invention.
Figure 2:
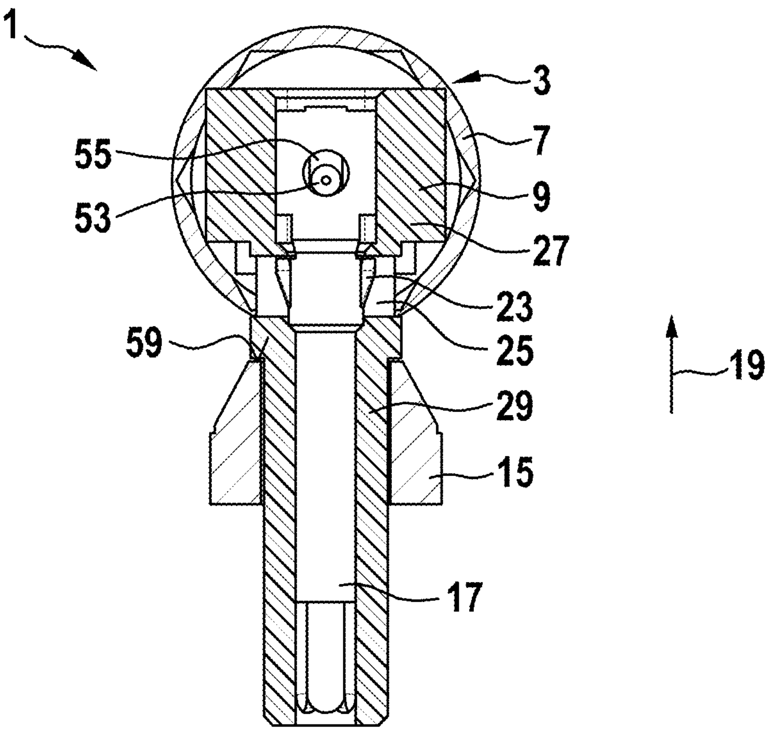
FIG. 2 shows a sectional view through an interface portion of the coaxial plug connector shown in FIG. 1.

FIGS. 1 and 2 illustrate a coaxial plug connector 1 in various sectional views. The coaxial plug connector 1 comprises a cable portion 3 and an interface portion 5. In the example shown, the coaxial plug connector 1 is configured as an angled plug connector, i.e. a longitudinal direction of extension 19 of the interface portion 5 runs perpendicular to a longitudinal direction of extension 21 of the cable portion 3.

The cable portion 3 has an outer cable contact 7, a cable insulator 9 and an elongated inner cable contact 11. The outer cable contact 7 is a die-cast component and the inner cable contact 11 is a punched/bent component made from an electrically conductive metal sheet. The cable insulator 9 is configured as a plastic component. The cable insulator 9 is accommodated in an inner volume surrounded by the outer cable contact 7. The inner cable contact 11 is accommodated coaxially in a central recess within the cable insulator 9 and via the latter it is spaced apart from the outer cable contact 7 in the radial direction and thus electrically insulated. In the example shown, the inner cable contact 11 is configured as a sleeve tapering from a first end to a second end, which forms a tip 53 at the second end. At the first end, the inner cable contact 11 is connected to an inner conductor 47 of a coaxial cable 45. For this purpose, the inner cable contact 11 with its first end and the inner conductor 47 may be crimped together, for example. An outer conductor 51 of the coaxial cable 45 is connected to the outer cable contact 7, also via a crimp, for example. On the cable 45 there is an insulation layer 49 between the outer conductor 51 and the inner conductor 47 which electrically separates the two conductors from each other.

The interface portion 5 has an outer interface contact 13, an interface insulator 15 and an elongated inner interface contact 17. The outer interface contact 13 is a deep-drawn component and the inner interface contact 17 is again configured as punched and bent component and the interface insulator 15 as a plastic component. The inner interface contact 17 is accommodated in a central recess coaxially inter alia things within the interface insulator 15 and inter alia via the latter is spaced apart from the outer interface contact 13 in the radial direction and thus electrically insulated.

The outer interface contact 13, the interface insulator 15 and the inner interface contact 17 are configured in terms of their geometric design, i.e. in particular with regard to their dimensions and shapes, such that they form an interface geometry 57 at a free end facing away from the cable portion 3, which is configured such that the coaxial plug connector 1 may be plugged together via its interface portion 5 with a correspondingly complementary interface geometry of a mating plug connector (not shown).

In the embodiment shown, the cable portion 3 of the coaxial plug connector 1 has an elongated shape in which a first opening 31 is formed in a lower region on a lower end face 37 of the outer cable contact 7. In the lower area adjacent to the end face 37, the outer cable contact 7 has a circular cross-section and surrounds the first, also circular opening 31 in the form of a sleeve-like wall. The likewise circular cable 45, together with the inner cable contact 11 attached to it, is inserted into this lower area via the first opening 31 in an insertion direction (i.e. vertically from bottom to top in the figure shown).

At a distance from the first opening 31, the outer cable contact 7 has a second opening 33 in an upper area on a circumferential surface 39. In the example shown, the second opening 33 is circular. In the upper area, the outer cable contact 7 is configured as a housing with a rectangular cross-section. The second opening 33 serves to create an internal connection between the cable portion 3 and the interface portion 5, which is shielded from the outside by the external cable contact 7 and the external interface contact 13. In this case, the inner interface contact 17 extends through the second opening 33 from a section facing towards the interface geometry 57 to a section accommodated in the inner volume in the outer cable contact 7. The outer interface contact 13 is mechanically and electrically connected to the outer cable contact 7. In particular, both outer contacts 13, 7 may be mechanically connected to each other in a non-detachable manner, for example by pressing, in such a way that they may no longer be separated from one another without causing damage once the coaxial plug connector 1 has been finally manufactured.

Also at a distance from the first opening 31, the outer cable contact 7 has a third opening 35 in an upper area on the circumferential surface 39. In the example shown, the third opening 35 is formed opposite the second opening 33 in the circumferential surface 39 of the outer cable contact 7. The third opening 35 is rectangular in the example shown. It has a width that substantially corresponds to a width of the outer cable contact 7 in the upper area or is slightly smaller than this. Therein, the width of the third opening 35 is equal to or greater than the width of the cable insulator 9 to be accommodated in the inner volume of the outer cable contact 7. A length of the third opening 35 is considerably greater than its width and in particular is the same length as or longer than a length of the cable insulator 9. In the finally assembled coaxial plug connector 1, the third opening 35 is closed with an electrically conductive cover 41. Consequently, the housing formed by the outer cable contact 7 then completely encloses the inner volume together with the cable insulator 9 accommodated therein and the inner cable contact 11 extending therein as well as at least a section of the inner interface contact 17 projecting into the inner volume, with the exception of the first and second openings 31, 33.

In the coaxial plug connector 1 shown in FIGS. 1 and 2, the inner interface contact 17 is attached to the cable insulator 9. In this case the inner interface contact 17 is spaced apart from the interface insulator 15 in the radial direction so that there is no direct contact or even engagement between the two components.

In the example shown, for this purpose the cable insulator 9 has a cable region 27 and an interface region 29. The elongated cable region 27 is configured to accommodate the inner cable contact 11. In other words, the cable insulator 9 with its cable region 27 encloses the inner cable contact 11 running centrally within it. The likewise elongated interface region 29 extends perpendicularly to the cable region 27 and is configured to accommodate at least a partial longitudinal region of the inner interface contact 17. In this case the interface region 29 encloses the inner interface contact 17, which is centrally located therein, at least partially. The interface region 29 of the cable insulator 9 is radially outwardly at least partially surrounded by the interface insulator 15. Consequently, the interface region 29 of the cable insulator 9 and the interface insulator 15 surrounding it jointly separate and insulate the inner interface contact 17 accommodated therein from the outer interface contact 13.

To be able to attach the inner interface contact 17 to the cable insulator 9, the inner interface contact 17 has one or more latching tabs 23 projecting radially outwards. In the example shown, the inner interface contact 17 is provided with two latching tabs 23 which project outwards in opposite directions. The cable insulator 9 accordingly has one or more recesses 25 in its interface region 29 in which the latching tabs 23 of the inner interface contact 17 may engage in a latching manner. When assembling the coaxial plug connector 1, the inner interface contact 17 is pushed into the central recess in the interface region 29 in an insertion direction (coming from the right in FIG. 1), wherein the latching tabs 23 initially spring radially inwards and then spring radially outwards when they reach the recesses 25.

In the example shown in FIGS. 1 and 2, the recesses 25 (only shown in FIG. 2) in the cable insulator 9 are provided at a position which is spaced from an end face 59 of the interface insulator 15 in a direction parallel to the longitudinal direction of extension 19 of the inner interface contact 17. Consequently, the recess 25 in the interface region 29 of the cable insulator 9 is not covered or overlapped by the interface insulator 15. Also, the recesses 25 are located on a portion of the interface region 29 which is located within the inner volume surrounded by the outer cable contact 7.

With such an embodiment of the latching between the inner interface contact 17 and the cable insulator 9, a particularly compact coaxial plug connector 1 may be formed, since, for example, the inner interface contact 17 only needs to protrude slightly beyond the circumferential surface 39 or the second opening 33, respectively, such that the interface portion 5 may be short.

Figure 3:
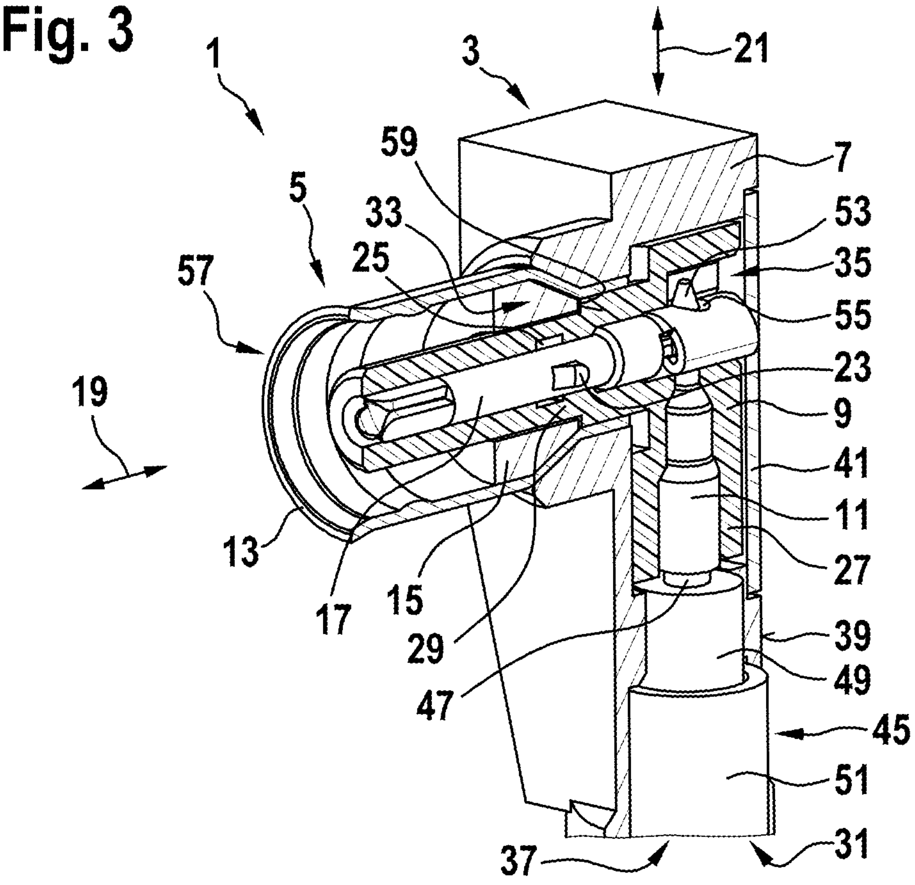
FIG. 3 shows a perspective cross-sectional view through a coaxial plug connector according to a second embodiment of the present invention.
Figure 4:
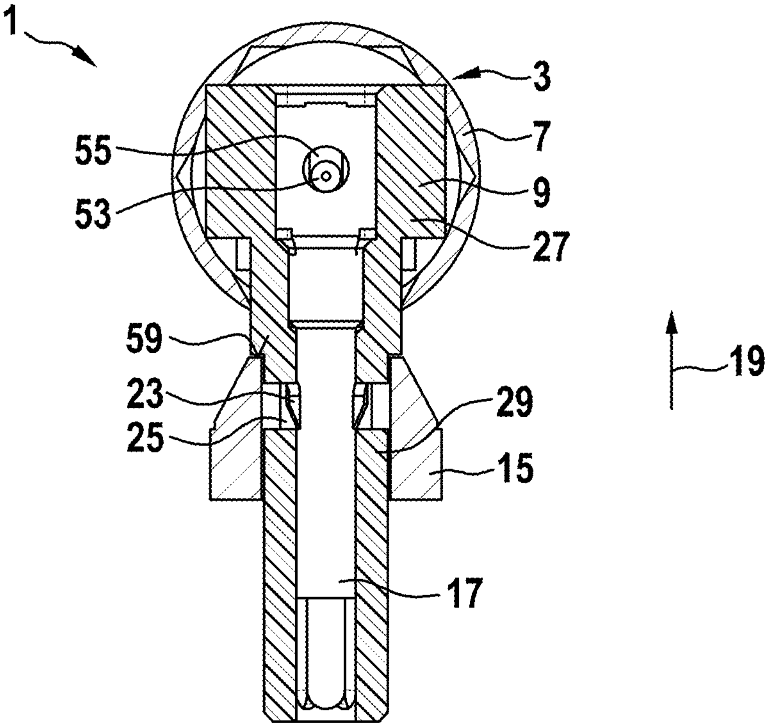
FIG. 4 shows a sectional view through an interface portion of the coaxial plug connector shown in FIG. 3.

FIGS. 3 and 4 show a modified embodiment of a coaxial plug connector 1. In terms of its components and features, the modified coaxial plug connector 1 is largely identical or similar to the coaxial plug connector 1 described above. However, it differs from the embodiment shown in FIGS. 1 and 2 in terms of the arrangement and/or configuration of the latching tabs 23 and the associated recesses 25. In particular, the recesses 25 in the cable insulator 9 are provided at a position that is covered by the interface insulator 15. In this case, the recesses 25 are provided at a position which is located outside the inner volume surrounded by the outer cable contact 7. In this embodiment, too, the inner interface contact 17 is spaced from the interface insulator 15 in the radial direction, i.e. its latching tabs 23 engage in the recesses 25 in the interface region 29 of the cable insulator 9, but not in the interface insulator 15. Consequently, in this embodiment too, the inner interface contact 17 may be attached to the cable insulator 9 independently of the interface insulator 15.

Figure 5:
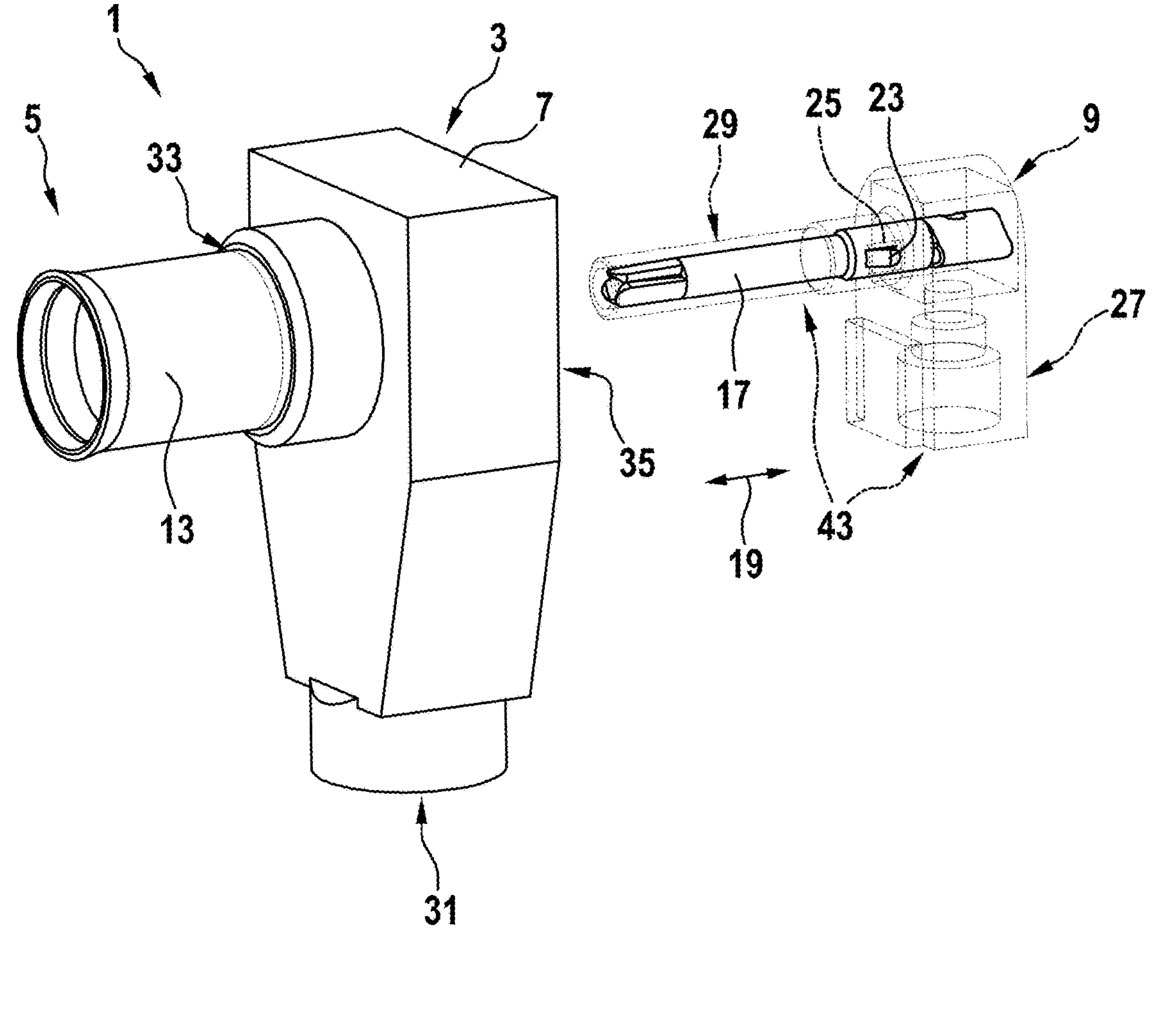
FIG. 5 shows a unit to be preassembled during a manufacturing process comprising a cable insulator and an inner interface contact for insertion into an outer cable contact of a coaxial plug connector according to an embodiment of the present invention.

Finally, a possible embodiment of a method for manufacturing the coaxial plug connector 1 is explained with reference to the figures described above and to the supplementary FIG. 5.

First, all components of the coaxial plug connector 1 are provided.

Then, in a preparatory step, the inner interface contact 17 is attached to the cable insulator 9. For this purpose, the inner interface contact 17 is inserted into the central recess in the interface region 29 of the cable insulator 9 in an insertion direction which corresponds to its longitudinal direction of extension 19 and moved until its latching tabs 23 engage in corresponding recesses 25 in the cable insulator 9. The inner interface contact 17 is thus attached to the cable insulator 9, particularly in the insertion direction, in a form-fitting manner. The cable insulator 9 together with the inner interface contact 17 latched inside it may then be further handled as a unit 43.

In particular, this unit 43 may be introduced into the inner volume in the outer cable contact 7. For this purpose, the unit 43 may be inserted through the large third opening 35 on a rear side of the outer cable contact 7 into the inner volume (i.e. coming from the right in FIG. 5), with the inner interface contact 17 and the interface region 29 of the cable insulator 9 surrounding it projecting on the opposite front side of the outer cable contact 7 outwards through the second opening 33 provided there.

The inner cable contact 11 together with the cable 45 previously attached to it may then be pushed through the first opening 31 into the cable insulator 9 already located in the inner volume in the outer cable contact 7, for example from below. The inner cable contact 11 may be pushed in until its tip 53 engages in a through-hole 55 near the rear end of the inner interface contact 17, thereby bringing the inner cable contact 11 into electrical contact with the inner interface contact 17.

The outer interface contact 13 may be attached to the outer cable contact 7 subsequently, simultaneously or beforehand. The interface insulator 15 may be introduced into the outer interface contact 13 or between the outer interface contact 13 and the inner interface contact 17 beforehand, simultaneously or afterwards. For this purpose, the outer interface contact 13 and/or the interface insulator 15 may be inserted into the second opening 33 in the outer cable contact 7 and irreversibly pressed together with the latter, for example.

Finally, it pointed out that terms such as "having", "comprising" etc. do not exclude other elements or steps, and terms such as "one" or "a" do not exclude a plurality. It should further be noted that features or steps that have been described with reference to one of the above embodiments may also be used in combination with other features or steps of other embodiments described above. Reference numbers in the claims are not to be considered as limitations.

LIST OF REFERENCES

1 Coaxial plug connector
3 Cable portion
5 Interface portion
7 Outer cable contact
9 Cable insulator
11 Inner cable contact
13 Outer interface contact
15 Interface insulator
17 Inner interface contact
19 Longitudinal direction of extension of the interface portion
21 Longitudinal direction of extension of the cable portion
23 Latching tab
25 Recess
27 Cable region of the cable insulator
29 Interface region of the cable insulator
31 First opening
33 Second opening
35 Third opening
37 End face of the outer cable contact
39 Circumferential surface of the outer cable contact
41 Cover
43 Unit
45 Cable
47 Inner conductor
49 Insulation layer
51 Outer conductor
53 Tip of the inner cable contact
55 Through-hole in the inner interface contact
57 Interface geometry
59 End face of the interface insulator

The invention claimed is:

1. A coaxial plug connector, comprising:
a cable portion and an interface portion,
wherein the cable portion has an outer cable contact, a cable insulator and an elongated inner cable contact, the cable insulator is arranged in the outer cable contact, the inner cable contact is spaced apart from the outer cable contact by the cable insulator, and the inner cable contact is to be electrically connected to a cable;
wherein the interface portion comprises an outer interface contact, an interface insulator and an elongated inner interface contact, the interface insulator is arranged in the outer interface contact and the inner interface contact is spaced apart from the outer interface contact by the interface insulator,
wherein the inner interface contact is attached to the cable insulator such that fixation in a longitudinal direction of the inner interface contact within the coaxial plug connector is achieved predominantly by at least one of form-fitting and force-fitting interaction between the inner interface contact and the cable insulator.

2. The coaxial plug connector according to claim 1,
wherein a longitudinal direction of extension of the interface portion runs transversely to a longitudinal direction of extension of the cable portion.

3. The coaxial plug connector according to claim 1,
wherein the inner interface contact is spaced apart from the interface insulator.

4. The coaxial plug connector according to claim 1,
wherein the inner interface contact has at least one radially outwardly projecting latching tab,
wherein the cable insulator has at least one recess in which the latching tab of the inner interface contact engages in a latching manner.

5. The coaxial plug connector according to claim 4,
wherein the recess is provided in the cable insulator at a position which is spaced from an end face of the interface insulator in a direction parallel to a longitudinal direction of extension of the inner interface contact and the recess is not covered by the interface insulator.

6. The coaxial plug connector according to claim 4,
wherein the recess in the cable insulator is provided at a position which is located within the inner volume surrounded by the outer cable contact.

7. The coaxial plug connector according to claim 4,
wherein the recess in the cable insulator is provided at a position that is covered by the interface insulator.

8. The coaxial plug connector according to claim 4,
wherein the recess in the cable insulator is provided at a position which is located outside the inner volume surrounded by the outer cable contact.

9. The coaxial plug connector according to claim 1,
wherein the cable insulator comprises a cable region and an interface region,
wherein the inner cable contact is arranged in the cable region of the cable insulator,
wherein the interface region of the cable insulator is arranged at least partially in the interface insulator, and
wherein the inner interface contact is arranged at least partially in the interface region of the cable insulator.

10. The coaxial plug connector according to claim 1,
wherein a longitudinal direction of extension of the cable portion runs transversely to a longitudinal direction of extension of the interface portion.

11. The coaxial plug connector according to claim 1,
wherein the outer cable contact has a first opening, a second opening and a third opening,
wherein the first opening is arranged on an end face of the outer cable contact,
wherein the second opening is arranged on the outer cable contact at a distance from the first opening, and
wherein the third opening is formed and arranged on a circumferential surface of the outer cable contact in such a way that, during the assembly process, the cable insulator may be inserted through the third opening into an inner volume in the outer cable contact.

12. The coaxial plug connector according to claim 11,
wherein the third opening is closed by a cover.

13. The coaxial plug connector according to claim 11,
wherein the second opening and the third opening lie opposite one another.

14. A method of manufacturing a coaxial plug connector according to claim 1, wherein the method comprises:
providing the outer cable contact, the cable insulator, the elongated inner cable contact, the outer interface contact, the interface insulator and the elongated inner interface contact; fastening the inner interface contact to the cable insulator;

attaching the outer interface contact to the outer cable contact;

inserting the interface insulator into the outer interface contact;

inserting the inner interface contact, together with the cable insulator attached thereto, into an inner volume in the outer cable contact;

inserting the inner cable contact into the cable insulator accommodated in the outer cable contact and bringing the inner cable contact into contact with the inner interface contact, wherein fixation in a longitudinal direction of the inner interface contact within the coaxial plug connector is achieved predominantly by at least one of form-fitting and force-fitting interaction between the inner interface contact and the cable insulator.

15. The method according to claim 14, wherein the method comprises:

inserting the inner interface contact together with the cable insulator attached thereto through the third opening of the outer cable contact into the inner volume in the outer cable contact.

16. The method according to claim 14, wherein the interface portion is configured in an application-specific manner by selecting at least one of the outer interface contact, the interface insulator and the elongated inner interface contact from a plurality of available respective components such that the interface portion has an application-specific interface geometry in terms of at least one of shape and dimensions so as to enter into a mechanical and electrical connection with an application-specific mating plug connector from a plurality of possible mating plug connectors.

* * * * *